(12) United States Patent
Nickel et al.

(10) Patent No.: US 7,126,449 B2
(45) Date of Patent: Oct. 24, 2006

(54) ELECTROMAGNETIC VALVE

(75) Inventors: Hans Nickel, Cottenweiler (DE); Claus Naegele, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 210 days.

(21) Appl. No.: 10/661,526

(22) Filed: Sep. 15, 2003

(65) Prior Publication Data
US 2005/0168310 A1 Aug. 4, 2005

(30) Foreign Application Priority Data
Sep. 14, 2002 (DE) ................................ 102 42 816

(51) Int. Cl.
*H01F 7/08* (2006.01)
(52) U.S. Cl. ................... 335/220; 251/129.15
(58) Field of Classification Search ........ 335/220–234, 335/256, 261–262; 251/129.01–19
See application file for complete search history.

(56) References Cited

U.S. PATENT DOCUMENTS 3,144,047 A * 8/1964 Tjaden .................. 137/625.48
5,707,039 A * 1/1998 Hamilton et al. ...... 251/129.17
6,415,817 B1 * 7/2002 Krimmer et al. ........... 137/550
6,453,930 B1 * 9/2002 Linkner et al. .......... 137/15.18

FOREIGN PATENT DOCUMENTS

DE 201 04 770 8/2001

* cited by examiner

*Primary Examiner*—Elvin Enad
*Assistant Examiner*—Bernard Rojas
(74) *Attorney, Agent, or Firm*—Walter Ottesen

(57) ABSTRACT

An electromagnetic valve (1, 21) includes a coil (2) which is fixedly connected to an iron core (3). An armature plate (5) is movably journalled in the direction of the coil longitudinal axis (22) relative to the iron core (3). At least two flow channels (8, 9; 26, 27, 28, 29) open at the armature plate (5) and are fluidly separated from each other when a current flows in the coil (2). A small structural size with a simple manufacture of the electromagnetic valve (1, 21) is achieved in that a flow channel (8; 26, 27, 28) opens in the peripheral region (32) of the armature plate (5) at the end (33) of the armature plate (5) facing toward the coil (2).

15 Claims, 2 Drawing Sheets

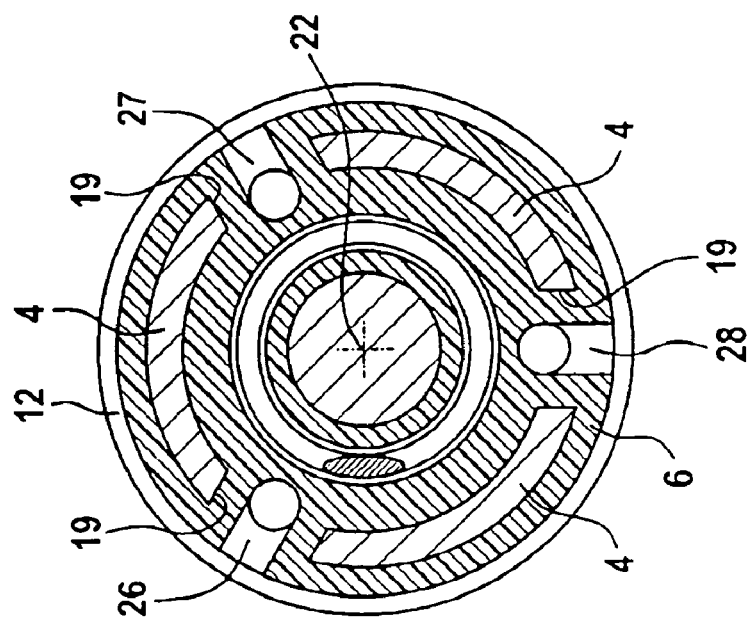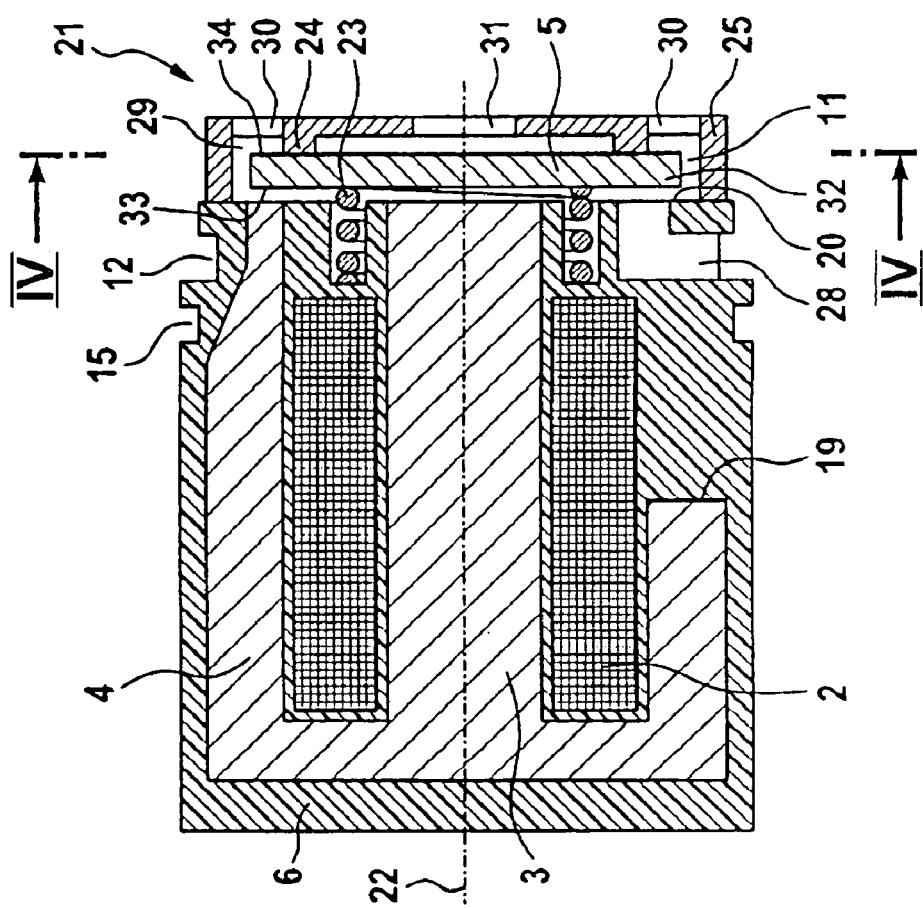

ELECTROMAGNETIC VALVE

CROSS REFERENCE TO RELATED APPLICATION

This application claims priority of German patent application no. 102 42 816.6, filed Sep. 14, 2002, the entire content of which is incorporated herein by reference.

BACKGROUND OF THE INVENTION

German patent publication 201 04 770 discloses an electromagnetic valve having a coil in which an iron core is mounted. An armature plate is arranged on the iron core and carries a sealing nub. The iron core includes an axial bore which is closed by the sealing nub when there is a current flow in the coil. The axial bore in the iron core negatively influences the magnetic flux in the iron core. The force, which is available for pulling the armature plate, is thereby reduced. In order to be able to generate a sufficiently large force, a larger coil must be used. In this way, the entire structural size of the arrangement is increased.

SUMMARY OF THE INVENTION

It is an object of the invention to provide an electromagnetic valve of the kind described above which can be manufactured with few parts and has a small structural size.

The electromagnetic valve of the invention includes: an iron core; a coil defining a longitudinal axis and being tightly connected to the iron core; an armature plate movably mounted for movement relative to the iron core in the direction of the longitudinal axis; the armature plate having a side facing toward the coil and having a peripheral region on the side; a first flow channel opening at the peripheral region; a second flow channel opening at the armature plate; and, the armature plate being movable between a first position whereat the first and second channels communicate with each other and, when there is a current flow in the coil, a second position whereat the first and second flow channels are fluidly separated from each other.

The flow channel opens at the peripheral region of the armature plate and hinders the electromagnetic flux only slightly. The coil and the iron core can be configured small while, at the same time, generating adequate forces on the armature plate. The armature plate is the only movable part so that only low forces are needed.

An advantageous configuration results when a second flow channel opens at the side of the armature plate facing away from the coil with this flow channel being provided for connecting to the first flow channel. The first flow channel is especially closed directly by the armature plate when there is current flow. Additional sealing elements thereby become unnecessary. A magnetically advantageous configuration results when the first and the second flow channels can be connected via an annular gap configured at the periphery of the armature plate. The armature plate can be configured as a massive plate because no breakthrough for throughflows are necessary. At the same time, a tilting of the armature plate at the outer periphery is avoided because of the provided distance.

A simple manufacture of the valve can be achieved when the coil and the iron core are injection molded in a common housing. Additional fixing means are therefore not necessary. In order to achieve a good sealing with the armature plate, the valve of the invention provides that the housing defines a contact surface for the armature plate with respect to which the iron core is set back. This contact surface is in the region of the opening of the first flow channel. The housing comprises especially plastic and so forms a sealing surface for the armature plate.

The valve includes a yoke in order to generate a favorable magnetic flux and therefore large forces for a small structural configuration. The yoke can especially be configured as one piece with the iron core. Advantageously, the yoke is completely injection molded in the housing with the iron core and the coil. The first flow channel is configured in the housing. The yoke includes a cutout at the region of the opening of the flow channel so that the flow channel is completely surrounded by the plastic forming the housing. It is practical to also set back the yoke with respect to the contact surface in order to not affect the sealing between the yoke and the housing.

In order to obtain a sufficient flow cross section, several first flow channels are provided which are fluidly connected to each other via an annular channel on the housing periphery. The first flow channels are especially arranged symmetrically about the longitudinal axis of the coil. To generate a reset force, the armature plate is spring biased in the direction away from the coil. An advantageous configuration results when the armature plate is guided by the spring. The axial movability of the armature plate is limited by a stop which is especially configured on a housing cover.

BRIEF DESCRIPTION OF THE DRAWINGS

The invention will now be described with reference to the drawings wherein:

FIG. 3 is a longitudinal section view through an electromagnetic valve according to another embodiment of the invention; and, FIG. 4 is a section view taken along line IV—IV of FIG. 3.

DESCRIPTION OF THE PREFERRED EMBODIMENTS OF THE INVENTION

Figure 1:
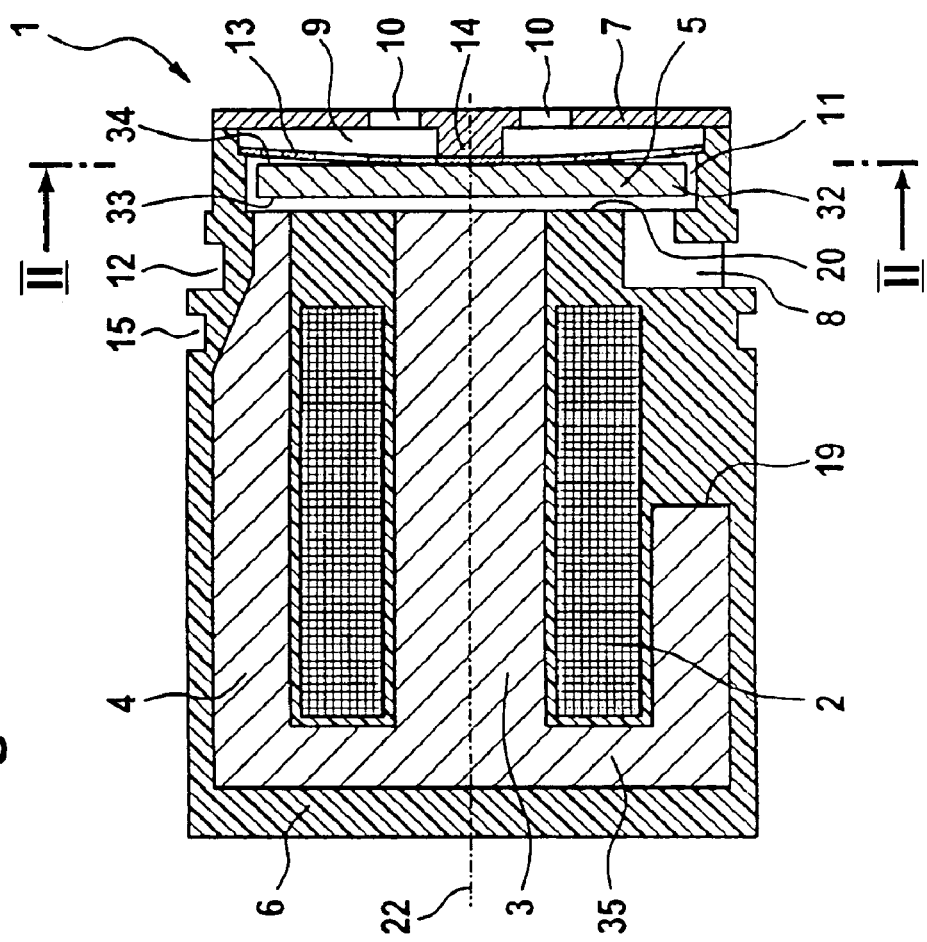
FIG. 1 is a longitudinal section view through an electromagnetic valve according to an embodiment of the invention.

The electromagnetic valve 1 shown in FIG. 1 has a coil 2 in which an iron core 3 is arranged. The iron core is configured as one piece with a yoke 4 surrounding the coil 2 at its outer periphery. The coil 2 and the yoke 4 with the iron core 3 are arranged in a housing 6. The components are injection molded in the plastic which forms the housing 6. The yoke 4 is configured to have a pot-like shape and the base 35 of the yoke 4 is connected to the iron core 3. At the end of the yoke 4 facing away from the base 35, an armature plate 5 is movably journalled in the direction of the longitudinal axis 22 of the coil 2.

The housing 6 is closed by a housing cover 7 at the end facing away from the base 35 of the yoke 4. A center stop 14 is arranged on the housing cover 7 and limits the movement of the armature plate 5 in the direction of the longitudinal axis 22 of the coil.

The armature plate 5 is configured to have the shape of a circular disc and is journalled in the housing 6 concentrically to the coil longitudinal axis 22 by a spring 13. An annular gap 11 is formed between the housing 6 and the armature plate 5 at the periphery of the armature plate. At the end facing toward the armature plate 5, the housing 6 defines a contact surface 20. A first flow channel 8 opens in the region 32 of the armature plate 5 at the contact surface 20 and this flow channel 8, for example, defines a supply or feed. The first flow channel 8 is configured in the housing 6. In the region of the first flow channel 8, the yoke 4 has a cutout 19 so that the first flow channel 8 is completely surrounded by the plastic forming the housing 6. It is practical to have several first flow channels 8 arranged symmetrically with respect to the longitudinal axis 22 of the coil. These flow channels 8 are fluidly connected to each other by an annular slot 12 formed on the housing periphery. At its outer periphery, the annular slot 12 is closed by a ring or cover (not shown). The cover can be fixed in a slot 15 configured to extend peripherally on the housing 6.

The iron core 3 and the iron yoke 4 can extend up to the contact surface 20. However, it is practical that the iron core and the iron yoke are set back slightly relative to the contact surface 20. In this way, it is ensured that the end 33 of the armature plate 5, which faces toward the coil 2, lies seal tight against the housing 6 when current flows in the coil 2. The contact surface 20, which is configured on the housing 6, thereby defines a sealing surface.

Figure 2:
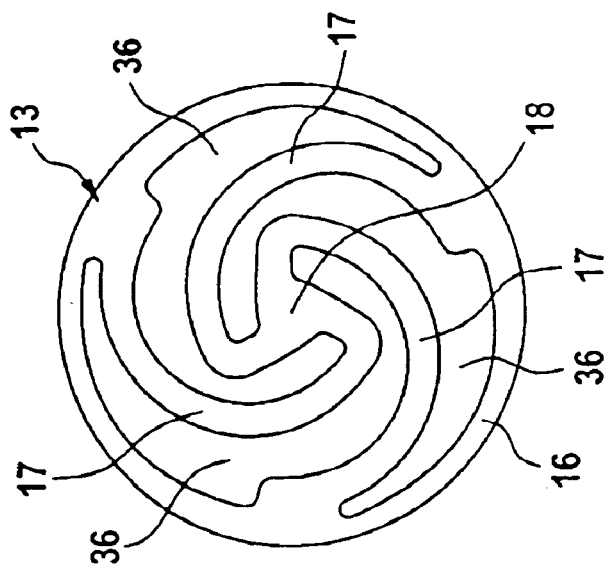
FIG. 2 is a section view taken along line II—II of FIG. 1.

The armature plate 5 is disposed centrally on a spider flexure spring 13 on the side 34 facing away from the coil 2. The spider flexure spring 13 is shown in FIG. 2. The spider flexure spring 13 includes a peripherally-extending edge 16 which is fixed on the housing 6. The edge 16 is connected to a central attachment section 18 via three rotationally symmetrically arranged arms 17. The armature plate 5 is fixed on the central attachment section 18. The arms 17 extend from the edge 16 spirally to the attachment section 18. The spider flexure spring 13 centers and guides the armature plate 5 and applies a reset force to the armature plate 5 in the direction toward the housing cover 7. The spider flexure spring 13 has breakthroughs 36 between the arms 17.

The valve 1 functions to fluidly connect one or several first flow channels 8 to a second flow channel 9 which is shown in the embodiment of FIG. 1 as the discharge. The second flow channel 9 opens on the side 34 of the armature plate 5 facing away from the coil 2 and communicates with the housing outer side via breakthroughs 10 in the housing, cover 7. With the current flow shut off, the iron core 3 and the yoke 4 generate no force on the armature plate 5 so that the armature plate 5 is pressed against the stop 14 by the spider flexure spring 13 and the flow channel 8 is fluidly connected to the second flow channel 9 via the annular gap 11. With the current flow in the coil 2 switched on, the coil 2 generates a magnetic field in the iron core 3 and the yoke 4 via which the magnetic armature plate 5 is pulled. The armature plate 5 then lies against the contact surface 20 on the housing 6 and closes the first flow channel 8 fluid tight.

Another embodiment of an electromagnetic valve 21 is shown in FIG. 3. The same reference numerals as in FIG. 1 are used for the same components. The armature plate 5 is biased relative to the housing 6 via a helical pressure spring 23 which is supported on the armature plate 5 at one end and is supported on the housing 6 on the other end. The helical pressure spring 23 is journalled between the iron core 3 and the yoke 4. The helical pressure spring 23 resiliently biases the armature plate 5 in the axial direction to the coil longitudinal axis 22. In addition, measures can also be taken which prevent a radial position change of the armature plate. At the end 34 lying opposite to the coil 3, the movability of the armature plate 5 is limited by a stop 24 which is configured on a housing cover 25. The housing cover 25 is connected to the housing 6 at the contact surface 20. The housing cover 25 includes a central opening 31 as well as breakthroughs 30 which are arranged on the peripheral region of the housing cover 25 and connect the second flow channel 29 to the outer side of the valve 21. The second flow channel 29 opens in the housing 6 at the armature plate 5.

As shown in FIG. 4, three first flow channels (26, 27, 28) are provided and are symmetrically arranged about the coil longitudinal axis 22 and are spaced one from the other at an angular spacing of 120°. The yoke 4 includes cutouts 19 in the region of the first flow channels (26, 27, 28). The first flow channels (26, 27, 28) are completely configured in the housing 6.

With the current in the coil 2 switched off, the armature plate 5 is in the position shown in FIG. 3. The first flow channels (26, 27, 28) are fluidly connected via the annular gap 11 to the second flow channel 29. The helical pressure spring 23 presses the armature plate 5 against the stop 24. If a current flows in the coil 2, then a magnetic field is generated in the iron core 3 and the yoke 4 via which the magnetic armature plate 5 is pulled against the housing 6. The armature plate 5 is pressed against the contact surface 20 on the housing 6 against the force of the helical pressure spring 23. The iron core 3 and the yoke 4 are slightly set back relative to the contact surface 20 so that a good sealing of the first flow channels (26, 27, 28) can be achieved. The stop 24 can also be configured as a peripherally-extending edge which seals the central opening 31 with respect to the second flow channel 29 with the armature plate 5. The central opening 31 is then only connected to the second flow channel 29 when the first flow channels (26, 27, 28) are closed. The stop 24 can, however, also be configured of several individual rises so that, in each position of the armature plate 5, the second flow channel 29 is connected to the central opening 31.

It is understood that the foregoing description is that of the preferred embodiments of the invention and that various changes and modifications may be made thereto without departing from the spirit and scope of the invention as defined in the appended claims.

What is claimed is:

1. An electromagnetic valve comprising:
an iron core;
a coil defining a longitudinal axis and being tightly connected to said iron core;
an armature plate movably mounted for movement relative to said iron core in the direction of said longitudinal axis;
said armature plate having a side facing toward said coil;
a first flow channel opening out at said armature plate at said side facing toward said coil;
a second flow channel opening out at said armature plate;
said armature plate having a peripheral region and said first flow channel opening out at said peripheral region of said armature plate;
said armature plate being movable between a first position whereat said first and second flow channels communicate with each other and a second position whereat said first and second flow channels are fluidly separated from each other; and,
wherein there is a current flow in said coil when said armature plate is in said second position.

2. The electromagnetic valve of claim 1, wherein said second flow channel opens out at a side of said armature plate facing away from said coil.

3. The electromagnetic valve of claim 1, wherein said first flow channel is closed by said armature plate when in said second position.

4. The electromagnetic valve of claim 2, further comprising an annular gap formed at the periphery of said armature plate; and, said first and second flow channels communicating with each other via said annular gap when said armature plate is in said first position.

5. An electromagnetic valve comprising:

an iron core;

a coil defining a longitudinal axis and being tightly connected to said iron core;

an armature plate movably mounted for movement relative to said iron core in the direction of said longitudinal axis;

said armature plate having a side facing toward said coil;

a first flow channel opening out at said armature plate at said side facing toward said coil;

a second flow channel opening out at said armature plate;

said armature plate having a peripheral region and said first flow channel opening out at said peripheral region of said armature plate;

said armature plate being movable between a first position whereat said first and second flow channels communicate with each other and a second position whereat said first and second flow channels are fluidly separated from each other;

wherein there is a current flow in said coil when said armature plate is in said second position;

said second flow channel opening out at a side of said armature plate facing away from said coil;

further comprising an annular gap formed at the periphery of said armature plate; and, said first and second flow channels communicating with each other via said annular gap when said armature plate is in said first position; and, said valve further comprising a housing common to said coil and said iron core and said coil and said iron core being injection molded in said housing.

6. The electromagnetic valve of claim 5, wherein said housing defines a contact surface for said armature plate in the region of the opening of said first flow channel; and, said iron core is set back from said contact surface.

7. The electromagnetic valve of claim 5, wherein said valve further comprises a yoke.

8. The electromagnetic valve of claim 7, wherein said yoke is formed as one piece with said iron core.

9. The electromagnetic valve of claim 7, wherein said first flow channel is formed in said housing and said yoke has a cutout formed in the region of said opening of said first flow channel.

10. The electromagnetic valve of claim 5, wherein said housing has an annular channel at the periphery thereof; and, said valve comprises a plurality of said first flow channels fluidly connected to each other via said annular channel.

11. The electromagnetic valve of claim 10, wherein said first flow channels are symmetrically arranged about said longitudinal axis.

12. The electromagnetic valve of claim 1, further comprising a spring for resiliently biasing said armature plate into said first position away from said coil.

13. The electromagnetic valve of claim 12, wherein said armature plate is guided by said spring.

14. The electromagnetic valve of claim 13, further comprising stop means for delimiting the axial movement of said armature plate.

15. An electromagnetic valve comprising:

an iron core;

a coil defining a longitudinal axis and being tightly connected to said iron core;

an armature plate movably mounted for movement relative to said iron core in the direction of said longitudinal axis;

said armature plate having a side facing toward said coil;

a first flow channel opening out at said armature plate at said side facing toward said coil;

a second flow channel opening out at said armature plate;

said armature plate having a peripheral region and said first flow channel opening out at said peripheral region of said armature plate;

said armature plate being movable between a first position whereat said first and second flow channels communicate with each other and a second position whereat said first and second flow channels are fluidly separated from each other;

wherein there is a current flow in said coil when said armature plate is in said second position;

further comprising a spring for resiliently biasing said armature plate into said first position away from said coil;

said armature plate being guided by said spring;

further comprising stop means for delimiting the axial movement of said armature plate; and, a housing common to said coil and said iron core and said coil and said iron core being mounted in said housing; and, a cover enclosing said armature plate and said stop means being formed on said cover.

* * * * *